Nov. 18, 1930.　　　H. WESSON　　　1,782,221
FLUSH VALVE
Filed July 28, 1927　　2 Sheets-Sheet 1
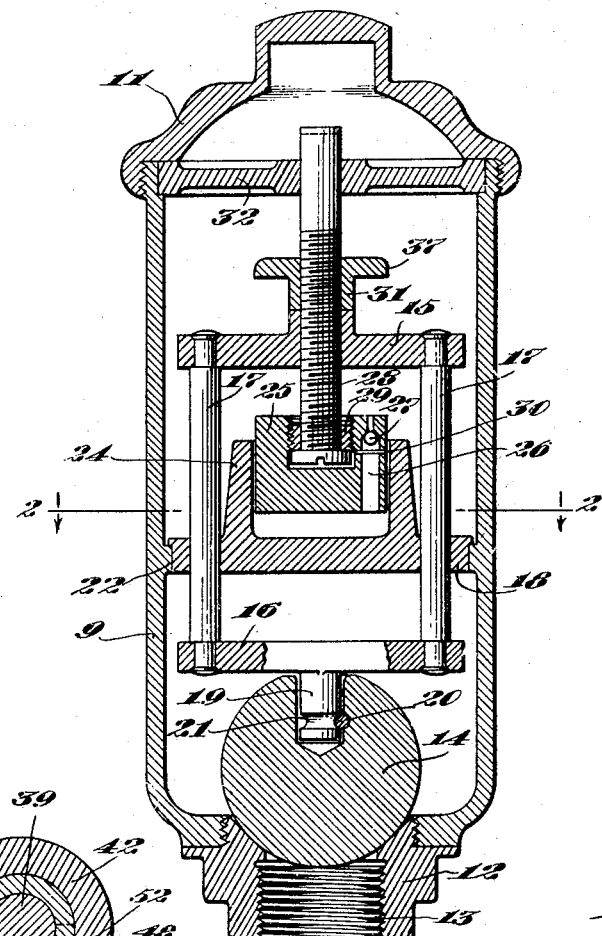
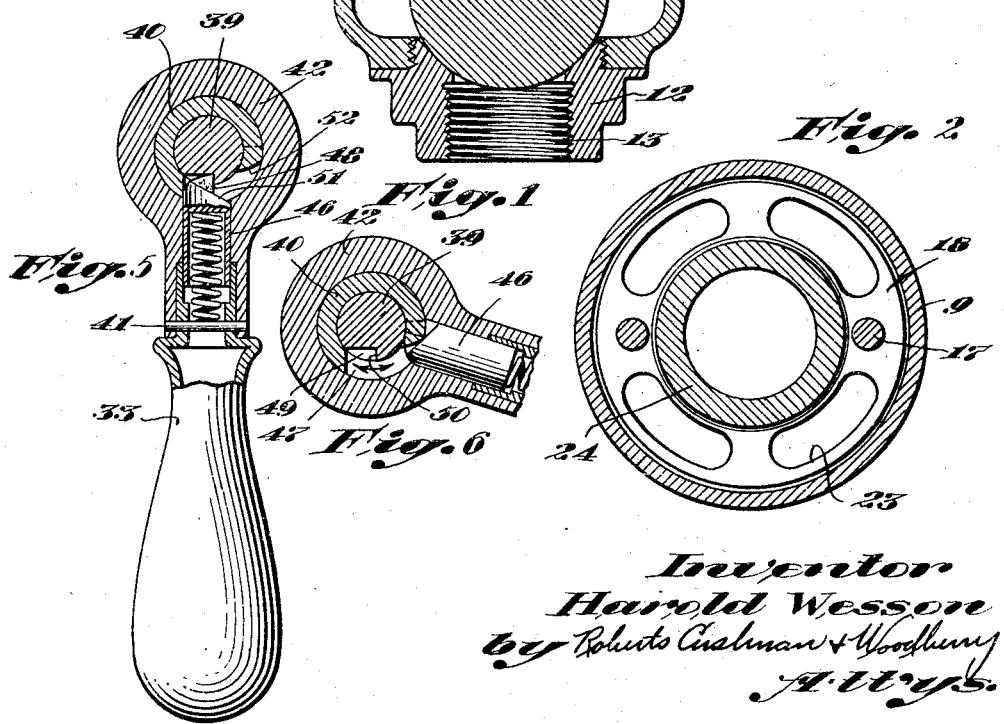
Inventor
Harold Wesson
by Roberts Cushman + Woodbury
Attys.

Nov. 18, 1930.  H. WESSON  1,782,221
FLUSH VALVE
Filed July 28, 1927  2 Sheets-Sheet 2
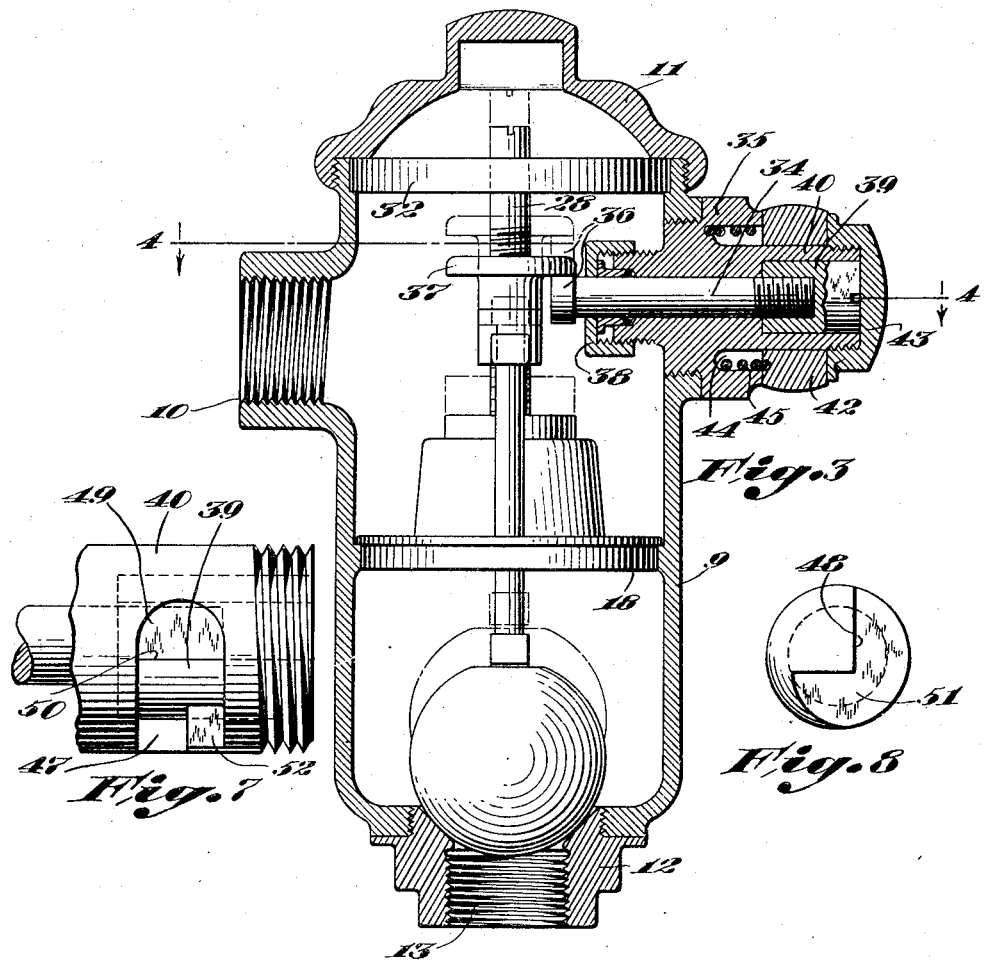
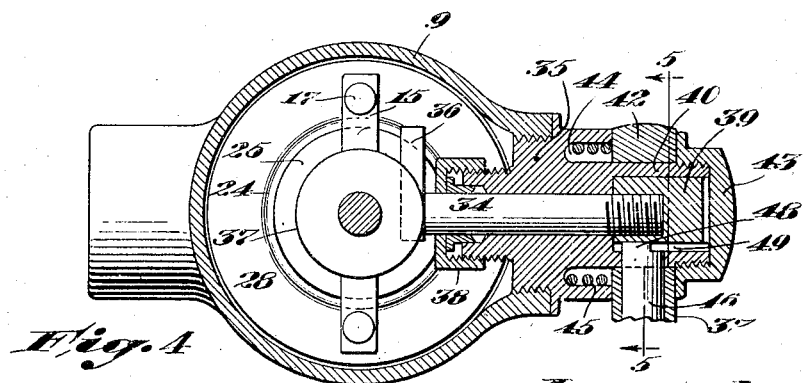
Inventor
Harold Wesson
by Roberts Cushman & Woodbury
Attys.

Patented Nov. 18, 1930

1,782,221

UNITED STATES PATENT OFFICE

HAROLD WESSON, OF SPRINGFIELD, MASSACHUSETTS, ASSIGNOR TO SMITH AND WESSON, INC., OF SPRINGFIELD, MASSACHUSETTS, A CORPORATION OF MASSACHUSETTS

FLUSH VALVE

Application filed July 28, 1927. Serial No. 209,097.

This invention relates to flush valves and has for its principal object the provision of a simple and economical device for automatically delivering a predetermined volume of fluid to a reservoir such as the basin of a water closet, or the like. One particular feature of the invention resides in the provision of a hydraulic governor, or dash pot, adapted to retard the closing movement of an outlet valve, the governor being preferably adjustable, so that a measured quantity of fluid will pass through the outlet after the mechanism for opening the valve is released. A further feature is to provide manually controlled apparatus for opening the valve so constructed and arranged that the valve is permitted to close before the release of the manual control. Additional objects reside in the particular structural improvements in the apparatus hereinafter described and pointed out in the appended claims, which furnish a compact and conveniently operated flush valve, usually silent in operation and durable in use.

A recommended embodiment of the invention is shown for the purpose of illustration in the accompanying drawings, in which:

Fig. 1 is a central vertical section of the improved valve;

Fig. 2 is a transverse section on the line 2—2 of Fig. 1;

Fig. 3 is a central vertical section of the device taken at right angles to that of Fig. 1;

Fig. 4 is a transverse section on the line 4—4 of Fig. 3;
Fig. 5 is a view of a handle for the valve, the sectional portion of which is taken on the line 5—5 of Fig. 4;

Fig. 6 is a fragmentary view of the structure illustrated in Fig. 5, showing a different position of the movable elements;

Fig. 7 is a detail view to enlarged scale of a portion of the apparatus; and

Fig. 8 is an enlarged end elevation of a plunger element shown in the handle of Figs. 5 and 6.

The structure includes a substantially cylindrical casing 9 having an inlet port 10 in its side wall, a removable cover 11, and a nipple 12 threaded into its bottom wall to provide an outlet port 13 and an interior seat for a ball or other poppet valve 14. A carriage or frame for the ball valve, comprising top and bottom cross heads 15 and 16, respectively, and diametrically disposed spacer rods 17, is mounted for sliding movement longitudinally of the casing in a guide plate 18 fixed within the bore of the casing and is provided with a bottom stem 19, preferably integral with the head 16, which is loosely received within a recess in the ball 14 and is retained therein by suitable locking means such as the lock pin 20 fast in the valve and extending loosely through the peripheral groove 21 of the stem 19. The ball valve is thus securely but loosely mounted upon the lifting carriage so that the ball will not bind upon the stem whereby a tight seating of the valve is insured.

The guide plate 18, which is preferably fitted upon an annular shoulder 22 of the casing, is provided with apertures 23 permitting the free and substantially unrestricted passage of water from the inlet port to the outlet port. It will be understood that the water or other fluid enters the inlet under considerable pressure and that the water pressure upon the ball valve 14 normally holds the valve in seated position over the outlet.

An hydraulic governor is provided to retard the seating movement of the valve, once the latter has been opened. This governor preferably comprises a dash pot disposed in the path of movement of the valve carriage and may comprise a central cylinder 24 integral with the guide 18, a piston 25 provided with a vent 26 and check valve 27 and having a stem 28 threaded in the head 15 and suitably fastened to the piston, as by means of the threaded collar 29 and screw 30. Sufficient clearance is provided between the cylinder and piston to prevent binding and to permit the slow escape of water as the piston moves downwardly. The extent to which the piston extends into the cylinder is preferably adjustable, whereby the time of downward movement of the piston may be so regulated that a measured volume of water is delivered through the outlet port before the ball valve is seated. This adjustment may readily be made by turning the stem 28 in the head 15 and a lock unit 31 is preferably provided to secure the desired adjustment. The top of the stem may extend through a hole in a guide plate 32 fixed within the top of the casing, so that the stem may be turned conveniently after removing cap 11.

The mechanism for lifting the valve carriage to open the ball valve preferably comprises a handle 33 and a rotatable shaft 34 mounted in a nipple 35 screwed into the side wall of the casing, the shaft having a cam 36 at its inner end bearing against the under side of a member carried by the carriage, such as the flange 37 of the lock unit 31. A stuffing box 38 may be threaded upon the inwardly projecting end of the nipple 35 to prevent leakage of water around the shaft. The handle is not directly connected to the shaft but said members are provided with cooperating elements adapted automatically to engage upon turning the handle to rotate the shaft and open the valve and to disengage upon further rotation of the handle, whereby the valve is permitted to close by pressure of the water within the casing (as regulated by the dash pot) and the shaft is consequently restored to its original position irrespective of the release of the handle.

For this purpose, the outer end of the shaft 34 is preferably provided with a cylindrical cap 39 threaded securely thereon and rotatable within an axial opening in the reduced tip 40 of the nippple 35, and the handle 33 is attached by a pin 41 (Fig. 5) to the neck of a sleeve 42 surrounding the tip 40. A cap 43 threaded upon said tip holds the sleeve in position against an annular shoulder of the nipple and this shoulder has an annular recess 44 within which is mounted a torsion spring 45 which is fastened to the nipple and sleeve, respectively, and which tends to hold the sleeve and handle in normal or inoperative position (shown in full lines in Figs. 3, 4 and 5).

The sleeve neck carries a spring pressed plunger 46, extending through an aperture 47 in the nipple tip 40 (Figs. 6 and 7), and the inner end of the plunger (Figs. 5 and 8) has a segmental shoulder or dog 48 adapted to enter a recess 49 (Figs. 4, 6 and 7) in the surface of the shaft cap 39 and to engage a shoulder 50 of said cap (Figs. 5, 6 and 7). The inner end of the plunger also has a beveled cam face 51 (Figs. 5 and 6) adapted to engage a cam 52 of the nipple tip 40 to disengage the dog 48 from the shoulder 50 after the handle has been moved a predetermined distance. As shown in Fig. 6, the shaft may then resume its original position, as stated above, even though the handle is accidentally or intentionally held in operative position.

The operation of the device is extremely simple. The ball valve is normally closed by pressure of the water and the handle is held in the inoperative position of Fig. 5 by the spring 45, as aforesaid. Movement of the handle then rotates the shaft and the cam 36 lifts the carriage and opens the discharge valve until the movable elements within the casing assume approximately the position indicated by the broken lines of Fig. 3. As the valve lifts water flows into the cylinder through passage 26 past check valve 27, as well as between the piston and cylinder, thereby permitting the valve to be opened quickly. As soon as the handle sleeve is moved to the position of Fig. 6, the shaft is released from the handle and the valve automatically closes. The closing movement of the valve will be retarded, as stated, by the dash pot, which insures a slow seating of the valve at a uniform speed, depending upon the time required for the water within the cylinder 24 to escape around the piston, as adjusted by regulation of the stem 28 and governed by the effective length of the clearance space between the piston and the cylinder.

A valve constructed in accordance with the foregoing description is economical to manufacture, easy to assemble and dissemble, and simple to operate; the structure is compact and may be so fashioned as to be attractive in appearance without sacrifice of operative efficiency; and the movable elements are so constructed and arranged that the operation of the valve is extremely quiet and that the possibility of faulty operation is remote. It will be understood, however, that details of construction may be varied for particular purposes without departing from the essence of this invention as defined in the following claims.

I claim:

1. A valve comprising a casing having a fluid outlet at its bottom, a valve within the casing for closing the outlet, said valve being normally seated by pressure of the fluid within the casing, a carriage within the casing connected to the valve and movable therewith longitudinally of the casing, a rotatable shaft having a cam adapted upon rotation of the shaft to engage and lift the carriage to move the valve off its seat against said fluid pressure, manually controlled means for rotating said shaft, and a dash pot consisting of a cylinder fixed transversely of the casing and a piston adjustably mounted in said carriage adapted to retard the seating of the valve, so that a predetermined volume of fluid is delivered through said outlet before the valve is seated.

2. A valve comprising a casing having fluid inlet and outlet ports, a valve for closing the outlet port, said valve being normally seated by pressure of the fluid within the casing, a carriage connected with the valve, means including a rotatable shaft and a handle therefor for lifting the carriage to move the valve off its seat against said fluid pressure, the shaft and handle having complemental elements adapted to engage upon turning the handle to rotate the shaft and lift the valve, said members being automatically disengaged upon further rotation of the handle, whereby the shaft is permitted to resume its original position irrespective of the release of the handle, and a dash pot consisting of a cylinder fixed within the casing and a piston adjustably mounted in said carriage adapted to retard the seating of the valve, so that a predetermined volume of fluid is delivered from said outlet port before the valve is seated.

3. A valve comprising a casing having fluid inlet and outlet ports, a valve for closing the outlet port, said valve being normally seated by pressure of the fluid within the casing, means including a rotatable shaft and a handle therefor for moving said valve off-seat against said fluid pressure, the shaft and handle having complemental elements adapted to engage upon turning the handle to rotate the shaft and open the valve and adapted upon further rotation of the handle automatically to disengage, whereby the shaft is permitted to resume its original position irrespective of the release of the handle, and an adjustable hydraulic governor adapted to retard the closing movement of the valve, so that a predetermined volume of fluid is delivered through said outlet port before the valve is seated.

4. In combination with a flush valve having a fluid outlet and a valve normally closing said outlet, means including a rotatable shaft and a handle therefor for opening the valve, the shaft and handle having complemental elements adapted to engage upon turning the handle to rotate the shaft and open the valve, said members being automatically disengaged upon further rotation of the handle, whereby the shaft is permitted to resume its original position and the valve to close irrespective of the release of the handle, so that a limited volume of fluid is delivered through said outlet before the valve is seated.

5. In combination with a flush valve having a fluid outlet and a valve normally closing said outlet, means including a rotatable shaft and a handle therefor for opening the valve, locking elements between the shaft and the handle, and cooperating shoulders carried by the shaft and handle respectively adapted automatically to disengage said locking elements after the handle has been turned a predetermined distance, whereby the shaft is permitted to resume its original position and the valve to close irrespective of the release of the handle, so that a limited volume of fluid is delivered through said outlet before the valve is seated.

6. In a flush valve, a hydraulic governor comprising a piston member and a cylinder member, at least one of said members being movable with respect to the other and the adjacent surfaces of the respective members being spaced to provide clearance for the passage of fluid into and out of the cylinder member, whereby the speed of movement of the piston member into the cylinder member is dependent upon the length of said movement, and means for adjusting the relative position of said elements whereby the length of the passageway between said elements may be varied.

7. A flush valve comprising a casing having a valve seat at one end, a guide mounted in the casing intermediate its ends, a cylinder on said guide having an open end facing away from the valve seat, a carriage having rods sliding in said guide and cross-heads interconnecting the rods on opposite sides of said guide, a piston mounted on one cross-head to cooperate with said cylinder, a valve on the other cross-head to cooperate with said seat, and a shaft journaled in the side of the casing with a handle on the outside and a cam on the inside for moving the carriage away from the valve seat, whereby when the carriage is moved in a direction away from the seat the valve is opened and the piston is moved rearwardly in the cylinder, the forward movement of the piston in the cylinder retarding the closing movement of the valve.

8. A flush valve comprising a casing having a valve seat at one end, a guide mounted in the casing intermediate its ends, a cylinder on said guide having an open end facing away from the valve seat, a carriage having rods sliding in said guide and cross-heads interconnecting the rods on opposite sides of said guide, a piston mounted on one cross-head to cooperate with said cylinder, a valve on the other cross-head to cooperate with said seat, and a threaded stem interconnecting the piston with its cross-head for adjusting the piston axially of the cylinder, whereby when the carriage is moved in a direction away from the seat the valve is opened and the piston is moved rearwardly in the cylinder, the forward movement of the piston in the cylinder retarding the closing movement of the valve.

9. A flush valve comprising a casing having a valve seat at one end, a guide mounted in the casing intermediate its ends, a cylinder on said guide having an open end facing away from the valve seat, a carriage having rods sliding in said guide and cross-heads interconnecting the rods on opposite sides of said guide, a piston mounted on one cross-head to cooperate with said cylinder, a valve on the other cross-head to cooperate with said seat, and a threaded stem interconnecting the piston with its cross-head for adjusting the piston axially of the cylinder, the stem extending through the end of the casing, whereby when the carriage is moved in a direction away from the seat the valve is opened and the piston is moved rearwardly in the cylinder, the forward movement of the piston in the cylinder retarding the closing movement of the valve.

10. A flush valve comprising a casing having a valve seat at one end, a guide mounted in the casing intermediate its ends, a cylinder on said guide having an open end facing away from the valve seat, a carriage having rods sliding in said guide and cross-heads interconnecting the rods on opposite sides of said guide, a piston mounted on one cross-head to cooperate with said cylinder, a valve on the other cross-head to cooperate with said seat, a threaded stem interconnecting the piston with its cross-head for adjusting the piston axially of the cylinder, the stem extending through the end of the casing, and a cap covering the projecting end of the stem, whereby when the carriage is moved in a direction away from the seat the valve is opened and the piston is moved rearwardly in the cylinder, the forward movement of the piston in the cylinder retarding the closing movement of the valve.

Signed by me at Springfield, Massachusetts, this 26th day of July, 1927.

HAROLD WESSON.